(12) United States Patent
Bhimanaik

(10) Patent No.: US 9,112,854 B1
(45) Date of Patent: Aug. 18, 2015

(54) SECURE COMMUNICATION BETWEEN APPLICATIONS ON UNTRUSTED PLATFORMS

(71) Applicant: Amazon Technologies, Inc., Reno, NV (US)

(72) Inventor: Bharath Kumar Bhimanaik, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 14/023,663

(22) Filed: Sep. 11, 2013

(51) Int. Cl.
*H04L 29/06* (2006.01)

(52) U.S. Cl.
CPC .................. *H04L 63/0823* (2013.01)

(58) Field of Classification Search
CPC ....................................................... H04L 63/08
USPC ..................... 713/153, 155, 176; 726/3, 5, 17
See application file for complete search history.

(56) References Cited

U.S. PATENT DOCUMENTS

| | | | | |
|---|---|---|---|---|
| 7,461,249 | B1 * | 12/2008 | Pearson et al. ................. | 713/156 |
| 2011/0088087 | A1 * | 4/2011 | Kalbratt ............................ | 726/7 |
| 2012/0331563 | A1 * | 12/2012 | Chaudhury et al. ............ | 726/27 |
| 2013/0297935 | A1 * | 11/2013 | Oswalt .......................... | 713/156 |
| 2014/0164776 | A1 * | 6/2014 | Hook et al. .................... | 713/171 |

OTHER PUBLICATIONS

"Algorithmic Tamper-Proof (ATP) Security: Theoretical Foundations for Security Against Hardware Tampering"—Gennaro et al, Bown Univ., Columbia Univ., Apr. 2004.*
U.S. Patent Application entitled "Synchronizing Authentication Sessions Between Applications," filed Sep. 11, 2013 under U.S. Appl. No. 14/023,840.

* cited by examiner

*Primary Examiner* — Randy Scott
(74) *Attorney, Agent, or Firm* — Thomas | Horstemeyer, LLP

(57) ABSTRACT

Disclosed are various embodiments for facilitating secure communication between applications on an untrusted computing platform. It is verified that a first application installed in a computing device has permission to communicate with a second application also installed in the computing device based at least in part on a secure key associated with the first application. The verification may include determining that the secure key has been signed by a predetermined certificate and determining that the secure key includes a platform-specific, tamper-proof identifier of the first application. Alternatively, the verification may include determining that the first application is signed by a predetermined certificate. Communication between the first and second applications is facilitated when the first application has permission to communicate with the second application.

21 Claims, 5 Drawing Sheets

SECURE COMMUNICATION BETWEEN APPLICATIONS ON UNTRUSTED PLATFORMS

BACKGROUND

An application executed in a computing device may need to communicate with another application in the computing device for various reasons. Such communication may be facilitated via inter-process communication (IPC) techniques. Examples of IPC techniques include communication via files, signals, sockets, message queues, pipes, semaphores, shared memory, and so on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enabling secure communication between applications executed in an untrusted computing platform. Secure communications between applications may be important to facilitate a single sign-on experience among the applications, to authenticate access of applications to secured services or resources, and for other reasons. However, on untrusted computing platforms (e.g., Android®, etc.), it may be that no facility is provided to verify the source of applications. For example, in Android®, applications are signed by a developer in order to be installed. However, such signatures are generated with self-signed digital certificates, which are not signed by a trusted certificate authority. Consequently, anyone can generate a self-signed certificate claiming to be the developer. Also, secret data embedded within an application is unreliable for facilitating secure communication for the reason that anything embedded in an application is likely to be extracted by others.

Various embodiments of the present disclosure facilitate secure communication between applications through the use of self-signed certificates. Although an identity behind a self-signed certificate may not be authenticated by a certificate authority, applications that are signed by the same self-signed certificate may be assumed to be from the same source. In one embodiment, a whitelist of one or more self-signed certificates may be maintained in an application for the purpose of facilitating secure communication among applications that are signed by those certificates. In another embodiment, an application signed by a different certificate may be associated with a secure key that is signed by one of the whitelisted certificates. The secure key may be employed to grant secured access to the application.

Figure 1:
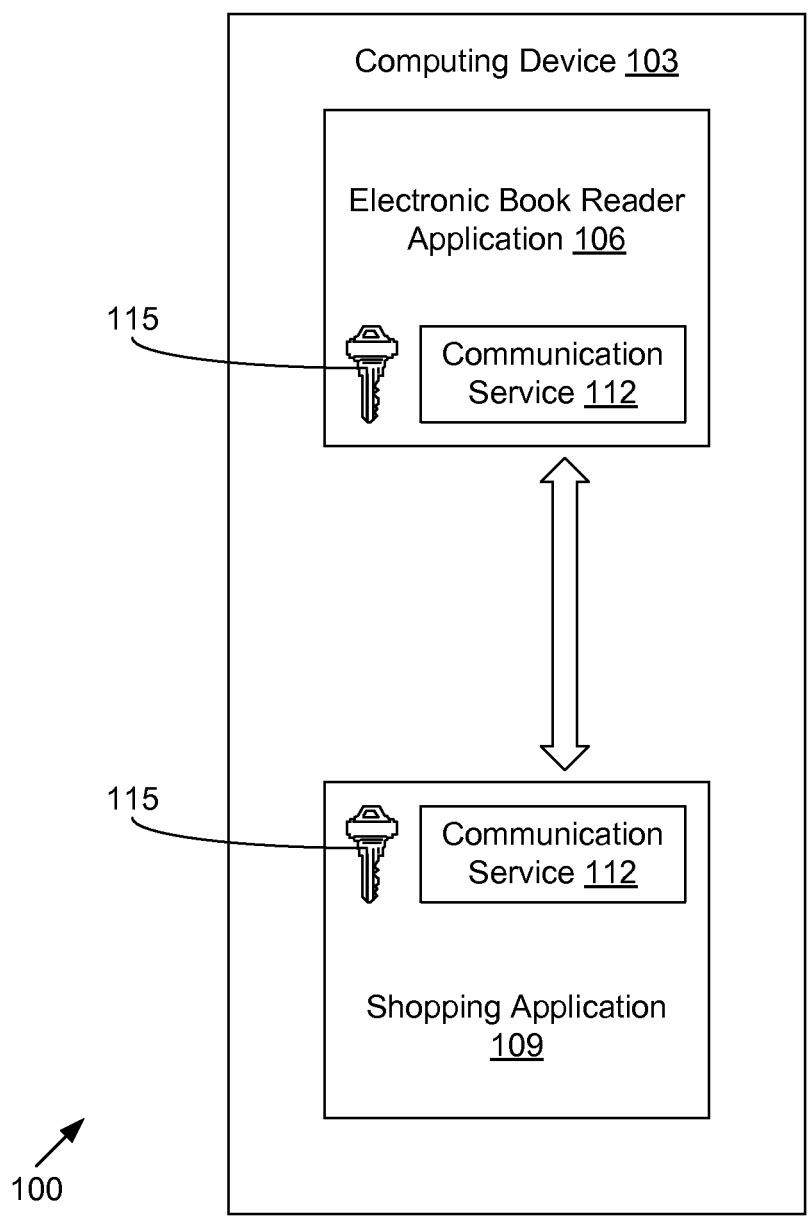
FIG. 1 is a drawing that illustrates an example scenario of secure communication in a computing device according to various embodiments of the present disclosure.

Turning now to FIG. 1, shown is an example scenario 100 depicting secure communication between two applications in a computing device 103 according to various embodiments of the present disclosure. In this non-limiting example scenario 100, the computing device 103 includes at least two applications: an electronic book reader application 106 and a shopping application 109. The computing device 103 executes an untrusted platform. For example, the computing device 103 may not include a facility for applications to authoritatively verify the identity and/or source of other applications. In one embodiment, despite having an untrusted platform, the computing device 103 may sandbox each application to prevent others from accessing the data and/or other resources of the application.

In order to facilitate secure communication between the applications, the electronic book reader application 106 and the shopping application 109 may each include a communication service 112. The communication service 112 may include a library loaded within the respective applications. For example, each of the applications may use a library to interface with an application programming interface (API) exposed by a separately executing communication service 112. The communication service 112 leverages a respective key 115 associated with each of the applications. The respective key 115 may correspond to a public key from a certificate used to sign the corresponding application. Alternatively, the respective key 115 may correspond to a signed collection of data used to verify the source or identity of the application.

Where the electronic book reader application 106 and the shopping application 109 are distributed by an organization that controls the communication service 112, the electronic book reader application 106 and the shopping application 109 may be considered "first-party" applications. For example, first-party applications may be signed by a predefined set of trusted certificates. Secure communication access may be granted when a particular application has been signed by a certificate from this predefined set. However, one or more applications may be distributed by a different organization for which the signing certificate is not available. Such applications may be considered "third-party" applications. In the case of third-party applications, secure communication access may be granted when a particular application is associated with an appropriate "secure key," or a collection of data signed by a certificate from the predefined set which permits the particular application to communicate. In the following discussion, a general description of the system and its components is provided, followed by a discussion of the operation of the same.

Figure 2:
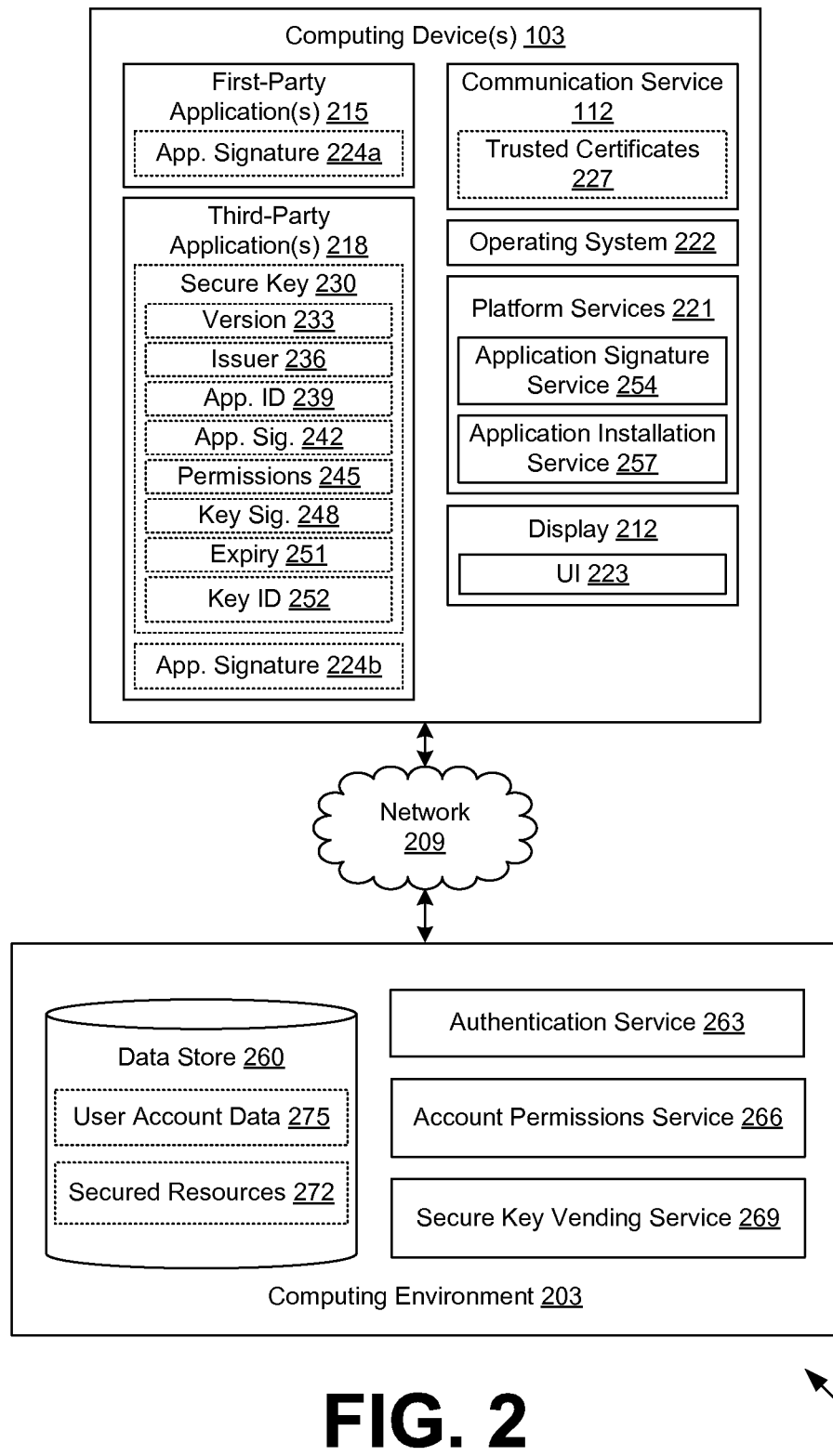
FIG. 2 is a drawing of a networked environment according to various embodiments of the present disclosure.

With reference to FIG. 2, shown is a networked environment 200 according to various embodiments. The networked environment 200 includes a computing environment 203 and one or more computing devices 103 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing device 103 is representative of a plurality of client devices that may be coupled to the network 209. The computing device 103 may comprise, for example, a processor-based system. Such a system may be embodied in the form of a desktop computer, a laptop computer, personal digital assistants, cellular telephones, smartphones, set-top boxes, music players, web pads, tablet computer systems, game consoles, electronic book readers, or other devices with like capability. The computing device 103 may include a display 212. The display 212 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The computing device 103 may be configured to execute various applications such as first-party applications 215, third-party applications 218, a communication service 112, platform services 221, and/or other applications. An operating system 222 may also be executed in the computing device 103. The first-party applications 215 and the third-party applications 218 may include social networking applications, email applications, mapping applications, contact manager applications, imaging applications, electronic book reader applications, music player applications, video player applications, and/or other types of applications. The first-party applications 215 and the third-party applications 218 may be configured to render a user interface 223 upon the display 212. The first-party applications 215 are those applications which have an application signature 224a generated by one of a set of trusted certificates 227. The third-party applications 218 are those applications which have an application signature 224b generated by a certificate that is not in the set of trusted certificates 227.

In one example, the first-party applications 215 are those distributed by an organization that distributes the communication service 112. The first-party applications 215 may also be distributed by other organizations that are in close cooperation with the organization that distributes the communication service 112, such that the authenticity and/or safety of the first-party applications 215 from the other organizations may be attested to by the organization that distributes the communication service 112. By contrast, the third-party applications 218 are not themselves signed by any of the trusted certificates 227, but are instead associated with a secure key 230 that is signed by a trusted certificate 227. Accordingly, the organization that distributes the communication service 112 or a related organization may attest to the authenticity and/or safety of the third-party application 218 on an individual basis using the secure key 230.

The secure key 230 may include various data used to facilitate secure communication between the third-party application 218 and other applications. Such data may include a version 233, an issuer 236, an application identifier 239, an application signature 242, one or more permissions 245, a key signature 248, an expiry 251, a key identifier 252, and/or other data. The version 233 may be used to indicate a particular version or format for the secure key 230, which may or may not be supported by the communication service 112. In one embodiment, the version 233 may be used in order to revoke previously issued versions of secure keys 230. The issuer 236 may include an identifier of an organization that issued the secure key 230, e.g., a trusted organization associated with one of the trusted certificates 227. An application identifier 239 may identify the associated third-party application 218 using a string or other identifier recognized by the operating system 222.

The application signature 242 may correspond to the application signature 224b and may be used to verify the association between the secure key 230 and the particular third-party application 218. In some cases, a hash value or other identifier of the application signature 224b may be included in the application signature 242 instead of the application signature 224b. On some platforms, e.g., iOS®, a bundle identifier may be employed rather than a signature, where the bundle identifier is a centrally issued, non-spoofable identifier for the third-party application 218.

The permissions 245 may indicate which applications are allowed to communicate with the associated third-party application 218 and/or which resources or level of access that will be granted to such applications. The key signature 248 corresponds to a signature of the secure key 230 or a portion thereof by one of the trusted certificates 227. The expiry 251 includes timestamp and/or other values indicating when the secure key 230 was issued and/or will expire. In one embodiment, the expiry 251 includes a creation timestamp and may be used to revoke all secure keys 230 having a creation timestamp before a threshold time. The key identifier 252 may correspond to a unique identifier for the secure key 230. The key identifier 252 may be used, for example, to facilitate revocation of a specific secure key 230 by specification of a corresponding key identifier 252 or omission of the corresponding key identifier 252 from a whitelist of key identifiers 252.

The secure key 230 may be encrypted or may be unencrypted. The secure key 230 may correspond to extensible markup language (XML), yet another markup language (YAML), JavaScript object notation (JSON), and/or other data formats.

The communication service 112 is executed to facilitate secure communication between two or more applications in the computing device 103. To this end, the communication service 112 may perform signature checking of first-party applications 215 to ensure that they are signed by one of the predefined trusted certificates 227. Alternatively, the communication service 112 may perform verification of a secure key 230 for a third-party application 218. For instance, when a first application desires to communicate with a second application, the communication service 112 may be configured to ensure that the first application should be granted access to communicate with the second application. Further, the communication service 112 may be configured to ensure that the second application should be granted access to communicate with the first application. Thus, it is noted that the security checks performed by the communication service 112 may be mutual. The communication service 112 may facilitate interprocess communication between applications using various approaches, e.g., pipes, sockets, message queues, etc.

Various platform services 221 may be executed in the computing device 103. Examples of such platform services 221 may include an application signature service 254 and an application installation service 257. A call to the application signature service 254 will return an application signature 224 that is associated with a given application, for example, as identified by an application identifier 239. It may be assumed that the application signature 224 returned by the application signature service 254 is valid. In some embodiments, a portion of the application signature 224 is returned, such as a public key used to verify the application signature 224.

The application installation service 257 is executed to facilitate installation of applications, such as the first-party applications 215 and the third-party applications 218, in the computing device 103. The operating system 222 may be configured so as to deny installation of applications except by way of the application signature service 254. The application installation service 257 may be configured to verify the application signature 224 associated with an application before the application is installed. However, in various embodiments, the applications may be signed by self-signed certificates, so such signature checks may not verify that the organization that issued the certificate is what it claims to be. Thus, the application platform embodied in the computing device 103 may be considered an untrusted platform.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 260 that is accessible to the computing environment 203. The data store 260 may be representative of a plurality of data stores 260 as can be appreciated. The data stored in the data store 260, for example, is associated with the operation of the various applications and/or functional entities described below.

The components executed in the computing environment 203, for example, include an authentication service 263, an account permissions service 266, a secure key vending service 269, and other applications, services, processes, systems, engines, or functionality not discussed in detail herein. The authentication service 263 is configured to authenticate access by applications to secured resources 272. For example, a user may provide security credentials to an application. Such security credentials may include a username, a password, and/or other security credentials. The application may send the security credentials to the authentication service 263 in order to receive an authentication token. Subsequently, the authentication token may be employed by the application to access various secured resources 272 to which the user account has been granted access.

An account permissions service 266 may be executed to facilitate centralized maintenance of account permissions. A user may indicate whether particular applications are to have access to secured resources 272. Additionally, a user may indicate whether particular applications are to have access to resources managed by other applications in the computing device 103. To this end, the account permissions service 266 may generate network pages or other user interfaces 223 that facilitate a user providing indications of consent or non-consent regarding permissions granted to an application.

The secure key vending service 269 is executed to return a secure key 230, if one exists, for a given application identified by an application identifier 239. In one embodiment, secure keys 230 are distributed along with the applications. In other embodiments, secure keys 230 are obtained separately from the application from the secure key vending service 269 upon installation of the application in the computing device 103. Alternatively, secure keys 230 may be obtained at runtime from the secure key vending service 269.

The data stored in the data store 260 includes, for example, user account data 275, secured resources 272, and potentially other data. The user account data 275 includes various data relating to user accounts. Such data may include security credentials (e.g., usernames, passwords, hashes of usernames and/or passwords, public keys, private keys, etc.), information relating to active or expired authentication sessions, access restrictions and/or permissions for the user account, maximum lifetime of sessions associated with the user account, and/or other account information. The secured resources 272 comprise static content, dynamic content, and/or operations that are network accessible to authenticated computing devices 103.

Next, a general description of the operation of the various components of the networked environment 200 is provided. To begin, a user installs various applications in the computing device 103. Such applications may include first-party applications 215 and third-party applications 218. The applications are installed via the application installation service 257. The application installation service 257 is configured to verify an application signature 224 of the application prior to installation and to obtain user consent to any platform permissions requested by the application. The application installation service 257 may provide source information to the user from the self-signed certificate used to sign the application, but such information may not be trusted.

When multiple applications are installed, one application may be configured to communicate with another application to access secured resources, exchange information, and/or perform other operations. Direct communication may be unavailable due to sandboxing of the applications on the device platform. Accordingly, the communication service 112 is used to facilitate this communication. In one embodiment, the communication service 112 comprises a library which is loaded by each application that is configured to communicate. Thus, the application programming interface (API) of the communication service 112 is made available to the application.

Given that the platform may be an untrusted platform, meaning that the platform services 221 are unable to verify application source identities, the communication service 112 is configured to verify the source of the application before facilitating communication. The applications and/or the communication service 112 may be associated with a whitelist of trusted certificates 227, and the application signature service 254 may provide signature information (e.g., a public key) to enable the communication service 112 to determine whether the applications were signed by one of the trusted certificates 227. In one embodiment, public keys corresponding to the trusted certificates 227 are distributed with a first-party application 215.

It may be impractical to include trusted certificates 227 for each and every application source. Therefore, secure keys 230 may be employed to verify third-party applications 218 that are not signed by trusted certificates 227. The secure keys 230 may be distributed with the third-party application 218 or obtained via the secure key vending service 269. The secure key 230 is signed by one of the trusted certificates 227 and can be used to verify whether the third-party application 218 is to be given communication access.

In one example scenario, the communication service 112 facilitates exchange of authentication tokens to provide a single sign-on and/or single log-out experience for applications that access a single user account authenticated by the authentication service 263 of an identity provider. For example, a single user account may be employed to access an email account, a file storage account, a shopping account, a music account, and/or other networked resources. Such resources often are accessed by way of different applications in the computing device 103. An authentication token exchange between the applications would avoid having to prompt the user for security credentials in each and every one of the applications. Security in such a token exchange is of paramount concern, and the various embodiments disclosed herein provide security via application signature comparison and/or verification of secure keys 230. Various approaches for token exchange are described in U.S. patent application entitled "SYNCHRONIZING AUTHENTICATION SESSIONS BETWEEN APPLICATIONS," filed on Sep. 11, 2013 under Ser. No. 14/023,840, which is incorporated herein by reference in its entirety.

Although the computing device 103 has been described as a single computing device 103, it is understood that the computing device 103 may comprise a plurality of different computing devices 103 in some embodiments. In one embodiment, the communication service 112 may facilitate communication between an application installed in a first computing device 103 and an application installed in a second computing device 103.

Figure 3:
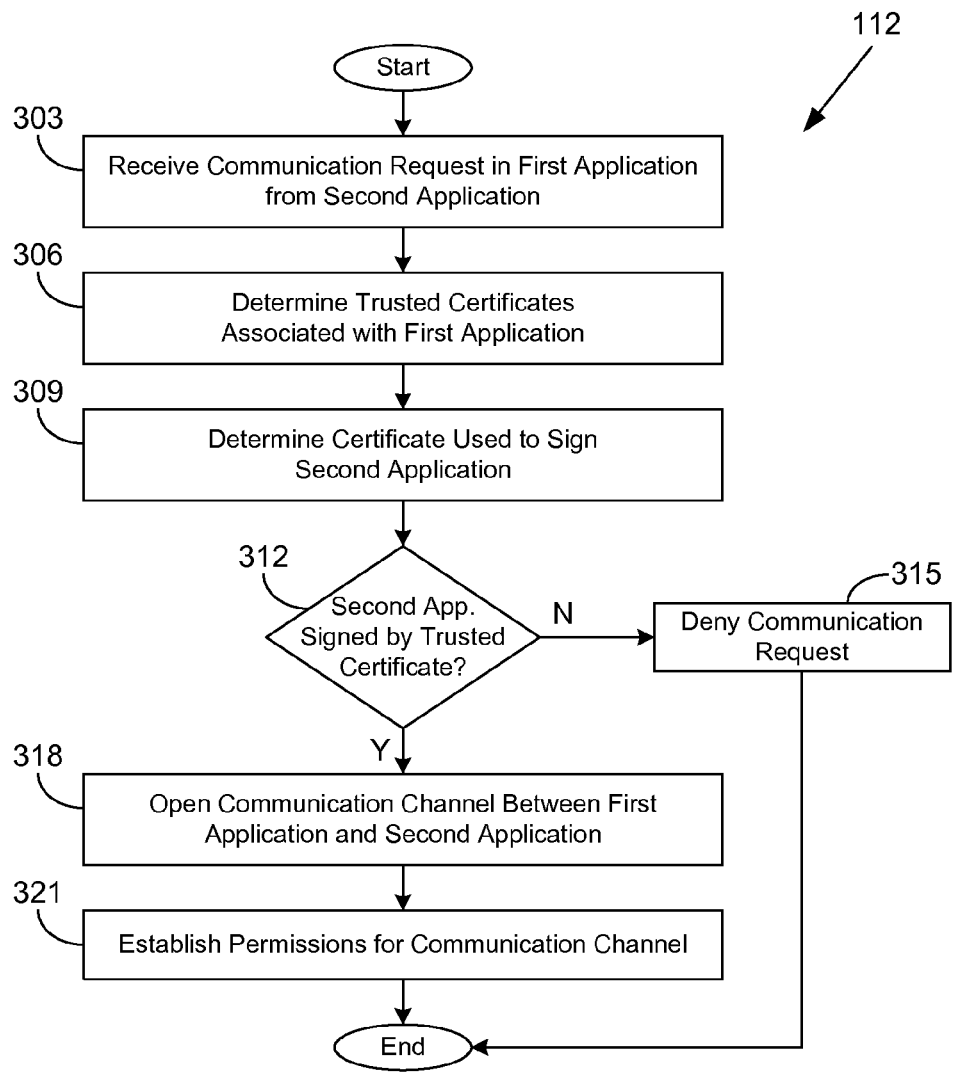
FIGS. 3 and 4 are flowcharts illustrating examples of functionality implemented as portions of a communication service executed in a computing device in the networked environment of FIG. 2 according to various embodiments of the present disclosure.

Referring next to FIG. 3, shown is a flowchart that provides one example of the operation of a portion of the communication service 112 according to various embodiments. Specifically, FIG. 3 relates to authentication of first-party applications 215 (FIG. 2) in the computing device 103 (FIG. 2). It is understood that the flowchart of FIG. 3 provides merely an example of the many different types of functional arrangements that may be employed to implement the operation of the portion of the communication service 112 as described herein. As an alternative, the flowchart of FIG. 3 may be viewed as depicting an example of steps of a method implemented in the computing device 103 according to one or more embodiments.

Beginning with box 303, the communication service 112 receives a communication request in a first application from a second application. In other words, it is determined that a second application requests to communicate with the first application. In box 306, the communication service 112 determines one or more trusted certificates 227 (FIG. 2) that are associated with the first application. For example, the first application may be associated with a whitelist of one or more trusted certificates 227 whose signature(s) are a prerequisite for an application to communicate with the first application. In one embodiment, one of the trusted certificates 227 corresponds to the trusted certificate 227 used to sign the first application.

In box 309, the communication service 112 determines the certificate used to sign the second application. For example, the communication service 112 may call the application signature service 254 (FIG. 2) to receive the application signature 224a (FIG. 2) for the second application. In various embodiments, the communication service 112 receives the public key used to verify the application signature 224a and/or an identifier of the public key.

In box 312, the communication service 112 verifies the source of the second application by determining whether the second application is signed by a trusted certificate 227 determined in box 306. The application signature 224 may be considered to be a form of tamper-proof metadata for the platform involved. The communication service 112 may compare a public key associated with a trusted certificate 227 with a public key associated with the application signature 224a for the second application. In some cases, identifiers rather than the actual public keys may be used for comparison. In one embodiment, the communication service 112 may attempt to verify the application signature 224a using public keys of the trusted certificates 227. Although the example of FIG. 3 involves verifying an application signature, it is understood that verifications may be performed in other embodiments based at least in part on other forms of tamper-proof metadata associated with the application. In the example of FIG. 3, if the second application has not been signed by one of the trusted certificates 227, the communication service 112 continues to box 315 and denies the communication request. Thereafter, the portion of the communication service 112 ends.

If, instead, the second application has been signed by one of the trusted certificates, the communication service 112 moves from box 312 to box 318 and opens a communication channel between the first application and the second application. Such a channel may be bidirectional or unidirectional. In box 321, the communication service 112 may establish permissions for the communication channel. For example, the communication service 112 may enable access by the second application to certain resources of the first application but not others. Such permissions may be maintained in the permissions 245 (FIG. 2) of a secure key 230 (FIG. 2) or in another configuration file. In one embodiment, the permissions are obtained from an account permissions service 266 (FIG. 2). In some cases, permissions may govern whether a communication channel may be opened in box 318. Thereafter, the portion of the communication service 112 ends. Although FIG. 3 involves verifying the source of the second application, it is understood that the communication service 112 may perform a similar verification on the first application as well.

Figure 4:
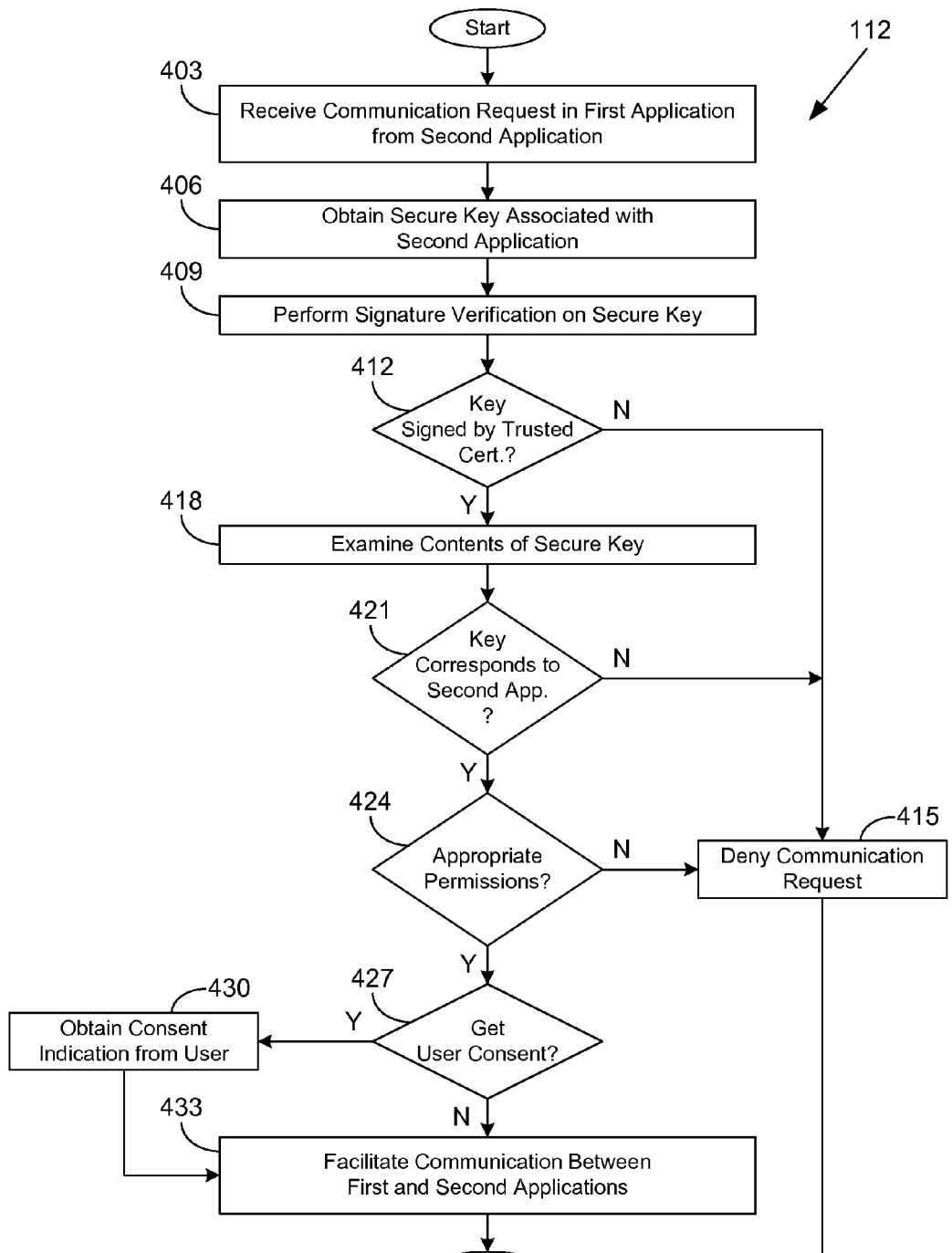

Moving on to FIG. 4, shown is a flowchart that provides one example of the operation of another portion of the communication service 112 according to various embodiments. Specifically, FIG. 4 relates to authentication of third-party applications 218 (FIG. 2) in the computing device 103 (FIG. 2). It is understood that the flowchart of FIG. 4 provides merely an example of the many different types of functional arrangements that may be employed to implement the operation of the other portion of the communication service 112 as described herein. As an alternative, the flowchart of FIG. 4 may be viewed as depicting an example of steps of a method implemented in the computing device 103 according to one or more embodiments.

Beginning with box 403, the communication service 112 receives a communication request in a first application from a second application. In one embodiment, the communication service 112 may first attempt to authenticate the second application according to predetermined trusted certificates 227 (FIG. 2) as in the flow depicted in FIG. 3. If the second application is not authenticated as in FIG. 3, the communication service 112 may proceed to box 406 as a fallback approach. In box 406, the communication service 112 obtains a secure key 230 (FIG. 2) associated with the second application. For example, the secure key 230 may be stored in the computing device 103 and obtained via a platform service 221 (FIG. 2). Alternatively, the secure key 230 may be requested from a secure key vending service 269 (FIG. 2) executed in the computing environment 203 (FIG. 2) based upon an identifier of the second application.

In box 409, the communication service 112 performs a signature verification on a key signature 248 (FIG. 2) of the secure key 230. The signature verification confirms that the secure key 230 was signed by one of the trusted certificates 227. The signature verification also ensures that various data within the secure key 230 has not been altered since the secure key 230 was initially generated in a secure environment. In box 412, the communication service 112 determines whether the secure key 230 was signed by a trusted certificate 227. If the secure key 230 was not signed by a trusted certificate 227 or if the contents of the secure key 230 do not match the key signature 248, the communication service 112 moves to box 415 and denies the communication request. Thereafter, the portion of the communication service 112 ends.

If, instead, the signature verification is successful and the secure key 230 is signed by a trusted certificate 227, the communication service 112 moves from box 412 to box 418. In box 418, the communication service 112 examines the contents of the secure key 230. The communication service 112 may perform various checks upon the contents of the secure key 230 in order to verify whether the second application should be given access to communicate with the first application. For example, the communication service 112 may verify that the secure key 230 does not have an expiry 251 (FIG. 2) that indicates expiration or that the secure key 230 does not have a version 233 (FIG. 2) that has been superseded or revoked.

In box 421, the communication service 112 determines whether the secure key 230 corresponds to the second application based at least in part on a platform-specific, tamper-proof identifier in the secure key 230. In one platform, the communication service 112 may compare an application identifier 239 (FIG. 2) with a non-spoofable identifier of the second application (e.g., an identifier vended or confirmable by a platform service 221 or a service in the computing environment 203). In another platform, the communication service 112 may compare the application signature 242 (FIG. 2) with an application signature 224b (FIG. 2) vended by the application signature service 254 (FIG. 2) or a service in the computing environment 203. In one embodiment, the application signature 242 may correspond to a hash value or other value computed from the application signature 224b of the application. In such an embodiment, a hash value or other value may be similarly computed from a reference application signature 224b of the application and compared to the application signature 242 in the secure key 230.

If the secure key 230 is determined not to correspond to the second application, the communication service 112 moves to box 415 and denies the communication request. Thereafter, the portion of the communication service 112 ends. Otherwise, the communication service 112 proceeds from box 421 to box 424.

In box 424, the communication service 112 determines whether a secure key 230 for the first application includes appropriate permissions 245 (FIG. 2) to facilitate the requested communication. For example, if the second application requests a specific type of resource from the first application, the secure key 230 for the first application may specify whether the second application is to be given access. If the secure key 230 for the first application does not include appropriate permissions 245 for the requested communication, the communication service 112 moves to box 415 and denies the communication request. Thereafter, the portion of the communication service 112 ends.

Otherwise, if the secure key 230 for the first application indicates appropriate permissions 245, the communication service 112 moves from box 424 to box 427 and determines whether user consent is to be obtained. While a secure key 230 for the first application may indicate that a source of the first application has approved permissions 245 for the second application, in some cases explicit user consent may be a prerequisite for communication.

If user consent is a prerequisite, the communication service 112 moves from box 427 to box 430 and obtains a consent indication from the user. For example, the communication service 112 may render a user interface 223 (FIG. 2) on the display 212 (FIG. 2) with identifying information about the second application, the first application, the resources requested of the first application by the second application, and/or other information. In another example, a browser may be launched to access a network page generated by an account permissions service 266 (FIG. 2) or other service that manages application permissions and user consent in the computing environment 203. A previous consent indication by a user may be cached in the computing device 103 and/or stored in the computing environment 203 so that future prompting of the user is avoided. Assuming a consent indication is obtained, the communication service 112 proceeds to box 433. If user consent is not a prerequisite, the communication service 112 transitions from box 427 to box 433.

In box 433, the communication service 112 facilitates communication between the first application and the second application in response to the communication request. Such communication may be bidirectional and/or unidirectional as the case may be. It is noted that verification of a secure key 230 of the first application may be performed in like manner in order for the first application to communicate with and access resources of the second application. In such a manner, a two-way handshake may be performed.

In one embodiment, once an application has been verified, the communication service 112 may store an association of an application identifier 239 (FIG. 2) with the verification of the application in a mapping. Subsequently, the communication service 112 may refer to the mapping to provide a verification lookup by name of the application or by application identifier 239. Thereafter, the portion of the communication service 112 ends.

Although the flowcharts of FIGS. 3 and 4 depict distinct process flows for establishing communication between first-party applications 215 and between third-party applications 218, respectively, the principles of the present disclosure may be applied to communication between a first-party application 215 and a third-party application 218. Where a first-party application 215 requests to access a resource of a third-party application 218, the communication service 112 may ensure that the first-party application 215 is signed by a trusted certificate 227. Likewise, where a third-party application 218 requests to access a resource of a first-party application 215, the communication service 112 may verify a secure key 230 associated with the third-party application 218. Moreover, it is noted that secure keys 230 may be associated with first-party applications 215 in some embodiments.

Figure 5:
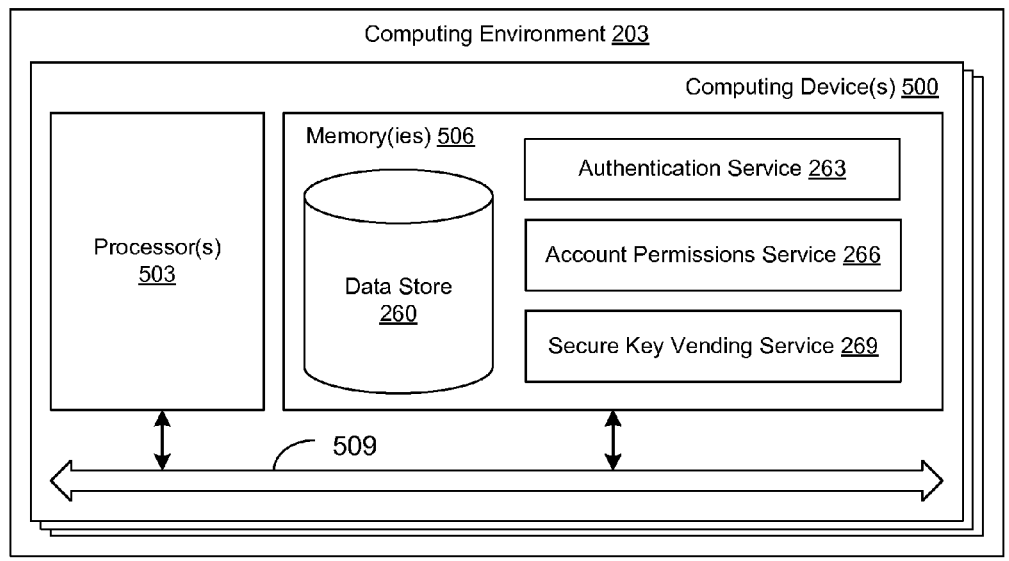
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the authentication service 263, the account permissions service 266, the secure key vending service 269, and potentially other applications. Also stored in the memory 506 may be a data store 260 and other data. In addition, an operating system may be stored in the memory 506 and executable by the processor 503.

Figure 6:
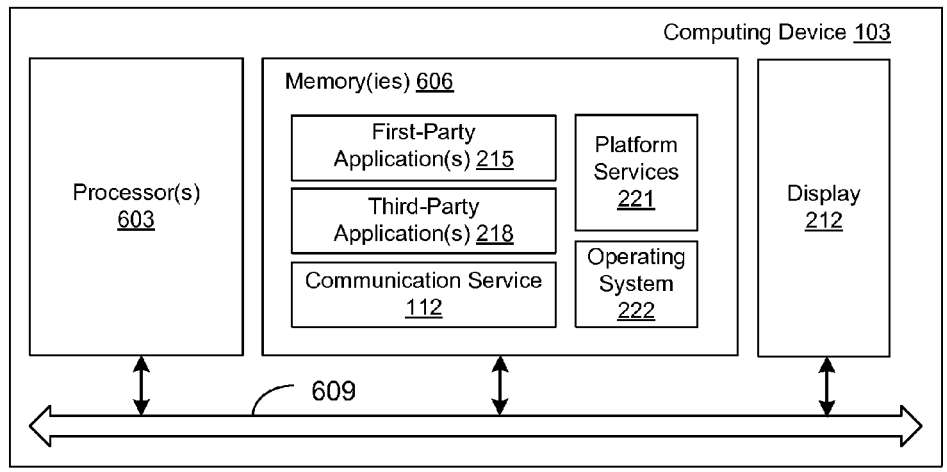
FIG. 6 is a schematic block diagram that provides one example illustration of a computing device employed in the networked environment of FIG. 2 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. The local interface 609 may comprise, for example, a data bus with an accompanying address/control bus or other bus structure as can be appreciated. A display 212 may also be coupled to the local interface 609.

Stored in the memory 606 are both data and several components that are executable by the processor 603. In particular, stored in the memory 606 and executable by the processor 603 may be the first-party applications 215, the third-party applications 218, the communication service 112, the platform services 221, and potentially other applications. In addition, an operating system 222 may be stored in the memory 606 and executable by the processor 603.

Referring now to both FIGS. 5 and 6, it is understood that there may be other applications that are stored in the memories 506, 606 and are executable by the respective processors 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memories 506, 606 and are executable by the respective processors 503, 603. In this respect, the term "executable" means a program file that is in a form that can ultimately be run by the processors 503, 603. Examples of executable programs may be, for example, a compiled program that can be translated into machine code in a format that can be loaded into a random access portion of the memories 506, 606 and run by the processors 503, 603, source code that may be expressed in proper format such as object code that is capable of being loaded into a random access portion of the memories 506, 606 and executed by the processors 503, 603, or source code that may be interpreted by another executable program to generate instructions in a random access portion of the memories 506, 606 to be executed by the processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503, 603 may each represent multiple processors 503, 603 and/or multiple processor cores and the memories 506, 606 may each represent multiple memories 506, 606 that operate in parallel processing circuits, respectively. In such a case, the local interfaces 509, 609 may be appropriate networks that facilitate communication between any two of the multiple processors 503, 603, between any processor 503, 603 and any of the memories 506, 606, or between any two of the memories 506, 606, etc. The local interfaces 509, 609 may comprise additional systems designed to coordinate this communication, including, for example, performing load balancing. The processors 503, 603 may be of electrical or of some other available construction.

Although the authentication service 263, the account permissions service 266, the secure key vending service 269, the first-party applications 215, the third-party applications 218, the communication service 112, the operating system 222, the platform services 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the communication service 112. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 3 and 4 depict a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 263, the account permissions service 266, the secure key vending service 269, the first-party applications 215, the third-party applications 218, the communication service 112, the operating system 222, and the platform services 221, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a service executable in a computing device, comprising:
   code that, in response to receiving a request to authenticate a first application installed in the computing device, determines whether the first application is a first-party application or a third-party application;
   code that, when the first application is a first-party application, determines that the first application is authenticated in response to determining that the first application was signed by a predetermined certificate; and
   code that, when the first application is a third-party application, determines that the first application is authenticated in response to determining that:
      the first application is associated with a secure key that was signed by the predetermined certificate; and
      the secure key includes an identifier of another certificate used to sign the first application, the other certificate differing from the predetermined certificate.

2. The non-transitory computer-readable medium of claim 1, further comprising code that facilitates communication between the first application and a second application in response to the first application being authenticated.

3. The non-transitory computer-readable medium of claim 1, further comprising code that determines whether the first application is to be given access to a resource of a second application based at least in part on a permission parameter included in the secure key and corresponding to the resource.

4. A system, comprising:
   a computing device; and
   a first application installed in the computing device, the first application comprising:
      logic that verifies a source of a second application installed in the computing device, the source of the second application being verified based at least in part on tamper-proof metadata associated with the second application, wherein the tamper-proof metadata comprises a signature of the second application, and the logic that verifies further comprises logic that determines whether the second application is signed by a predetermined certificate associated with the first application by:
         receiving a first public key associated with the second application from a platform service of the computing device; and
         comparing the first public key to a second public key of the predetermined certificate; and
      logic that opens a communication channel with the second application in response to verifying the source of the second application.

5. The system of claim 4, further comprising logic that determines that the second application is a third-party application.

6. The system of claim 4, wherein the computing device is configured to ensure that a signature check using the first public key was performed upon the second application before the second application was installed.

7. The system of claim 4, wherein the first application is signed by the predetermined certificate.

8. The system of claim 4, wherein the predetermined certificate comprises one of a plurality of predetermined certificates, and a corresponding plurality of public keys associated with the plurality of predetermined certificates are included in the first application.

9. The system of claim 4, wherein the predetermined certificate is a self-signed certificate, and a platform service of the computing device is configured to verify a signature of an application before the application is permitted to be installed in the computing device.

10. The system of claim 4, wherein the first application and the second application are separately sandboxed by an operating system of the computing device.

11. The system of claim 4, wherein the computing device comprises a plurality of computing devices, the first application is installed in a first one of the plurality of computing devices, and the second application is installed in a second one of the plurality of computing devices.

12. The system of claim 4, wherein the logic that opens the communication channel employs a communication service of the computing device that is accessible to the first application and the second application.

13. A method, comprising:
   verifying, via at least one of one or more computing devices, that a first application installed in the one or more computing devices has permission to communicate with a second application installed in the one or more computing devices based at least in part on a secure key associated with the first application, the verifying further comprising:
      determining that the secure key has been signed by a predetermined certificate; and determining that the secure key includes a platform-specific, tamper-proof identifier of the first application; and facilitating, via at least one of the one or more computing devices, communication between the first application and the second application in response to verifying that the first application has the permission to communicate with the second application.

14. The method of claim 13, wherein facilitating the communication between the first application and the second application is performed further in response to verifying, via at least one of the one or more computing devices, that the second application has permission to communicate with the first application based at least in part on another secure key associated with the second application.

15. The method of claim 13, wherein the verifying further comprises:

rendering, via at least one of the one or more computing devices, a prompt for a user to provide consent to the communication;

receiving, via at least one of the one or more computing devices, a consent indication from the user; and wherein the communication is facilitated in response to receiving the consent indication from the user.

16. The method of claim 13, wherein the verifying further comprises determining that the secure key includes a parameter indicating a permission to access a secured resource of the second application.

17. The method of claim 13, wherein the verifying further comprises determining that the secure key has not expired based at least in part on a parameter extracted from the secure key.

18. The method of claim 13, wherein the verifying further comprises:

extracting, via at least one of the one or more computing devices, an identifier of a public key from the secure key; and determining, via at least one of the one or more computing devices, that the first application was signed by a certificate corresponding to the public key.

19. The method of claim 13, further comprising ensuring, via a platform service of at least one of the one or more computing devices, that the identifier of the first application uniquely identifies the first application.

20. The method of claim 13, wherein the predetermined certificate was used to sign the second application, and a different certificate was used to sign the first application.

21. The method of claim 13, wherein the secure key is included in the first application.

* * * * *